(12) United States Patent
Scaglia

(10) Patent No.: US 6,247,870 B1
(45) Date of Patent: *Jun. 19, 2001

(54) FITTING DEVICE

(75) Inventor: Enzo Scaglia, Milan (IT)

(73) Assignee: Scaglia S.p.A., Brembilla (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,153

(22) Filed: Jan. 28, 1999

(51) Int. Cl.[7] ........................................ F16B 7/04
(52) U.S. Cl. .................... 403/351; 403/350; 403/348; 403/371
(58) Field of Search ..................... 403/351, 350, 403/371, 289, 290, 109.5, 110, 348

(56) References Cited

U.S. PATENT DOCUMENTS

| 718,727 | * | 1/1903 | Potstada | 403/350 X |
|---|---|---|---|---|
| 1,783,825 | | 12/1930 | Brown. | |
| 2,391,302 | * | 12/1945 | Evans | 403/350 X |
| 2,949,682 | * | 8/1960 | Kuhn | 403/351 |
| 4,602,411 | | 7/1986 | Brown. | |
| 4,632,437 | * | 12/1986 | Robson et al. | 403/350 X |
| 4,738,561 | | 4/1988 | Röttger. | |
| 5,048,998 | * | 9/1991 | Viets | 403/351 |
| 5,356,183 | * | 10/1994 | Cole | 403/350 X |
| 5,460,458 | * | 10/1995 | Caceres | 403/109.5 |
| 5,931,598 | * | 8/1999 | Wang | 403/351 |

FOREIGN PATENT DOCUMENTS

| 34 41 457 | 5/1986 | (DE) . |
|---|---|---|
| 399 265 | 2/1909 | (FR) . |
| 2 151 713 | 7/1985 | (GB) . |

\* cited by examiner

Primary Examiner—Lynne H. Browne
Assistant Examiner—David Eric Bochna
(74) Attorney, Agent, or Firm—Millen, White, Zelano & Branigan, P.C.

(57) ABSTRACT

A detachable fitting device fits a mechanical component endowed with a cylindrical hole onto a shaft of circular section. The fitting device has an end collar having a substantially elliptical seat and a bush equipped with an elastically deformable external side surface for the reception of the shaft. The fitting is shaped to fit in the elliptical seat. The bush has a first size, measured along a straight line perpendicular to the axis of the bush, inclusive between minor and major diameters of the elliptical seat, and a second size, measured along a straight line perpendicular to the bush axis, which second side has a length which is less than the minor diameter of said elliptical seat.

17 Claims, 2 Drawing Sheets

FITTING DEVICE

BACKGROUND OF THE INVENTION

1. Field of the Invention

The present invention relates to a device which can be used to fit in a reversible way a mechanical component equipped with a cylindrical hub onto a cylindrical shaft, and in particular to a device that allows a tractor roller for yarn, usually of a plastic material, to be fitted onto a metal shaft which is circular in section.

2. Background Art

Devices have been known some time that allow the reversible fitting of mechanical components with conical bores onto cylindrical shafts by means of a split or bushing with cylindrical internal surface and conical external surface. A groove on the external surface of the bush allows the same bush to be fixed to the hub by screws or grub-screws, while a keyway is cut into the internal surface of the bush and the external surface of the shaft to allow the bush to be keyed to the shaft.

However, the laboriousness of the operation to produce the keyways and the play that results, with time, between hub and shaft, make this solution unadvisable, particularly if the mechanical component is of plastic material.

Friction-fitting devices have also been known for fitting mechanical components with cylindrical bores, comprising at least one pair of conical split bushes, which bear respectively on the hub and on the shaft involved in the fitting.

To allow the transmission of a torque via friction, these devices must develop considerable radial forces that bear against the hub of the mechanical component. Therefore, such fitting devices require mechanical components with hubs that are very large in relation to the shaft diameters. They could also present dismantling problems due to the two bushes jamming onto the surfaces with which they are in contact.

An alternative technique widely used particularly for fitting yarn tractor rollers onto metal shafts consists of the provision of a plurality of threaded through-holes disposed radially along the external surface of the roller to accommodate pressure screws, which exercise a force on one piece by means of their end while the screw stem is screwed into a threaded hole in the other piece. When tightened the screws hold the shaft securely creating a detachable coupling of the roller to the same shaft.

However, this solution, which is adequate for the transmission of low torques between shaft and hub, has the drawback that it is difficult to center the mechanical component precisely on the shaft and therefore does not allow a correct balancing of the roller in motion. A further, but no less significant, drawback is that the screw holes accommodating the screws could damage the same yarn by acting as an impediment to the free sliding of thread.

OBJECTS OF THE INVENTION

An object of the present invention is to provide a device for the reversible fitting of mechanical components—in particular of mechanical components subject to low torques—to cylindrical shafts that is self-centering, which does not involve the presence of roughness on the external surface of the roller and which is simple to produce and operate.

SUMMARY OF THE INVENTION

This object is achieved by the present invention which relates to a device for the fitting of mechanical components equipped with a cylindrical hub onto shafts of circular section, comprising at least one hub end collar that includes a substantially elliptical seat or opening, and a bush so shaped as to engage in said elliptical seat said bush having an elastically deformable external side surface that presents a first size, measured perpendicularly to the axis of the same bush, which falls between the minor diameter and the major diameter of said elliptical seat and a second size, measured perpendicularly to the same axis, which is less than the minor diameter of the elliptical seat.

Preferably the bush of the device according to the invention presents at least one cutout that confers elasticity on it and that defines the said second dimension.

This bush can thus be inserted into the elliptical seat in an unlocked position in which the first size corresponds to the major diameter of the elliptical seat, thereafter it is rotated and forced so that its greater size results close to the minor diameter of said elliptical seat. In this second position not only the major size of said bush, but also the cutout gap—and therefore the cross-sectional area of the bush perpendicular to the axis of the same bush—is reduced.

Thus, arranging the shaft internally in both the cylindrical hub and the bush and positioning the bush in the elliptical seat of the hub end collar, thereafter rotating the same bush in said seat until it is forced to reduce said cutout gap(s), a locking, i.e. a fitting, of the shaft to the mechanical component is thus achieved.

A preferred embodiment of the invention will be described, by way of example and not of limitation, with reference to the attached drawings in which:

DESCRIPTION OF THE PREFERRED EMBODIMENTS

Figure 1:
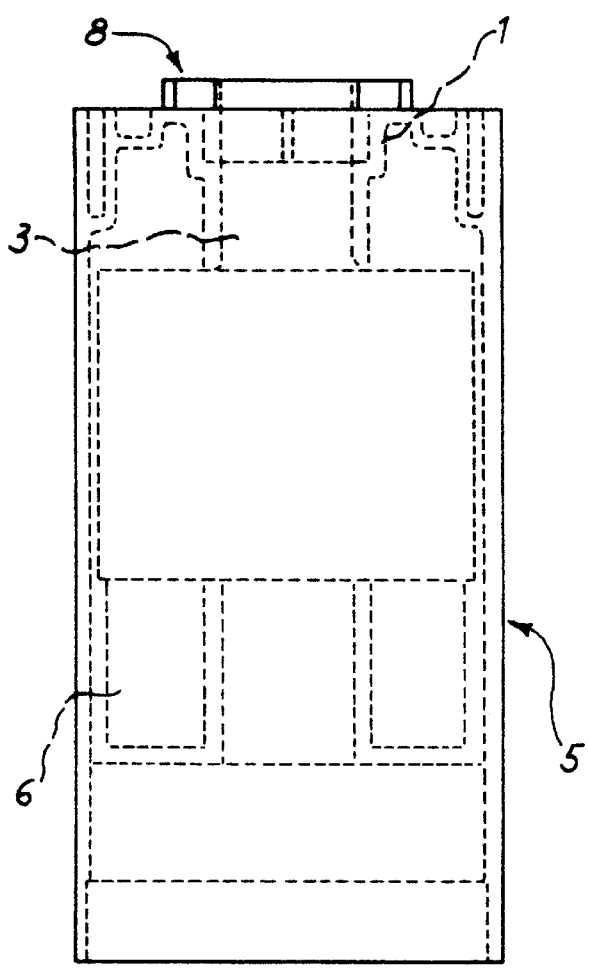
FIG. 1 is a side view of a tractor roller for yarn according to the invention which the cross-section is shown by broken lines.
Figure 2:
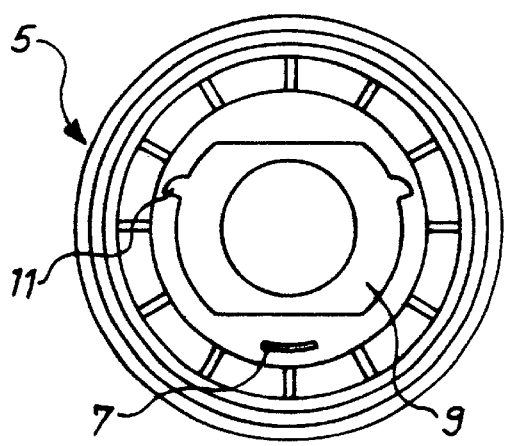
FIG. 2 is a top view of the tractor roller, comprising a bush according to the invention cooperating with an end collar of the fitting hub.
Figure 5:
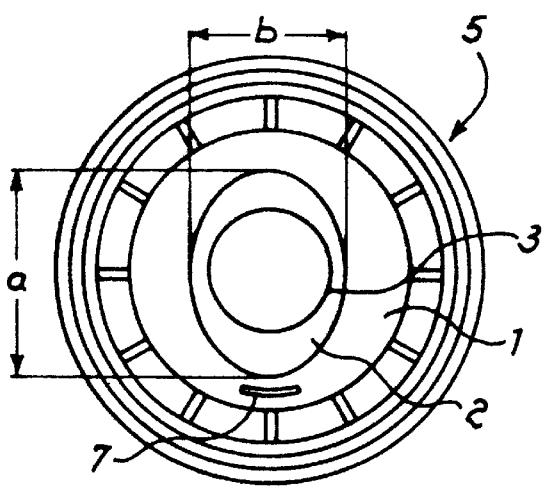
FIG. 5 is a top view of the tractor roller, not engaged with the bush.

With reference to FIGS. 1 and 5, the fitting device comprises an end collar 1 of the fitting hub 3 endowed with a substantially elliptical opening or seat 2, which presents a major diameter "a" and a minor diameter "b."

In the particular embodiment described, the end collar 1 is in one piece with the fitting hub 3 and with the tractor roller, shown altogether as 5.

Further, a perforated plug 6, placed at the extremity opposite the end collar 1, allows to completely define an housing for a shaft to be fitted.

Figure 3:
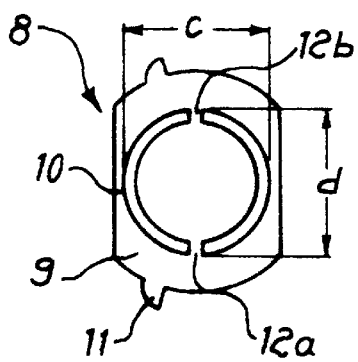
FIG. 3 is a top view of the collar.
Figure 4:
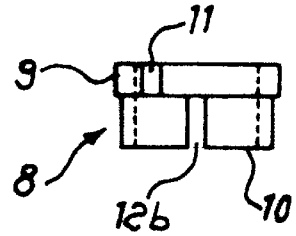
FIG. 4 is a side view of the collar in which a cutout is clearly seen.

A prominence 7 is foressen on the end collar 1 to identify a stop for the travel of bush 8, corresponding to the locking or fitting position. As shown in FIGS. 3 and 4, the bush 8 comprises an end ring 9 endowed with lugs 11 to allow a forced rotation (by means of a suitable tool) of the bush 8 in the elliptical seat 2 and to locate, by contacting the prominence 7, the fitting position of the bush 8.

The external side surface 10 of the bush 8 is substantially cylindrical with a circular section of diameter "c" and presents two diametrically opposite cutouts 12a and 12b, that define a second size "d" of the same external surface 10, smaller than said dimension "c."

The size "c" of the surface 10 of the bush 8 is furthermore inclusive between the diameters "a" and "b" of the elliptical seat 2, while the size "d" of the same surface 10 is less than the minor diameter "b" of seat 2.

According to an alternative embodiment, not shown in the Figures, the section of the side surface 10 is substantially elliptical and the cutouts are present in correspondence to the minor diameter thereof.

According to a further aspect of one embodiment, the cutouts separate two semicircular section surfaces of equal radius.

Arranging the bush 8 in the elliptical seat 2 so that the size "d" of the same bush 8 coincides with the minor diameter "b" of the elliptical seat 2, in a first 'unlocked' position, and inserting the shaft to be fitted into both the bush 8 and the hub 3, thereafter forcing the said bush 8 to rotate until it fits against the prominence 7, in a second locking position, the shaft is truly fitted.

In fact the locking position, in which the size "c" of the bush 8 is forced and rendered near the same as the minor diameter "b" of elliptical seat 2, involves the reduction of the of the cross-sectional area of the side surface 10 through reduction of the cutout gaps 12a and 12b and consequently a compression action exerted by the internal surface of the bush 8 against the external surface of the shaft to be fitted, so to allow the transmission of a torque from the shaft to the tractor roller 5.

An alternative embodiment of the invention, not shown in the figures, comprises two end collars, placed at the base of the tractor roller and equipped with elliptical seats, as well as two corresponding bushes to fit with precision the mechanical component onto the cylindrical shaft.

Figure 6:
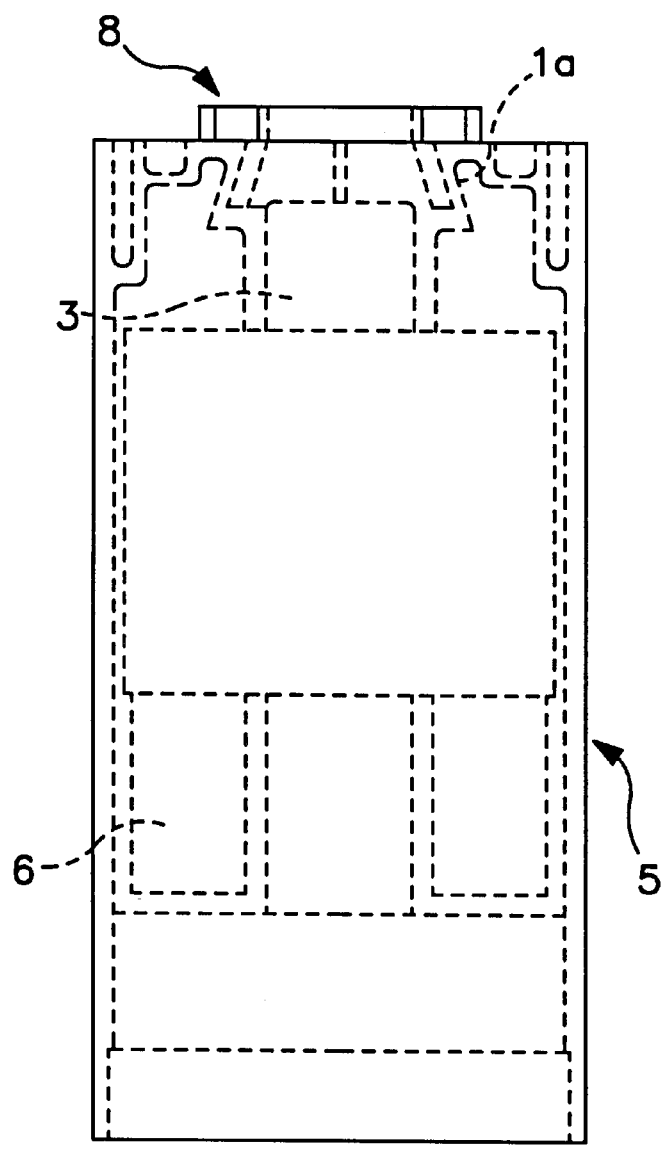
FIG. 6 is a view similar to FIG. 1, but showing conical surfaces for an elliptical seat.
Figure 7:
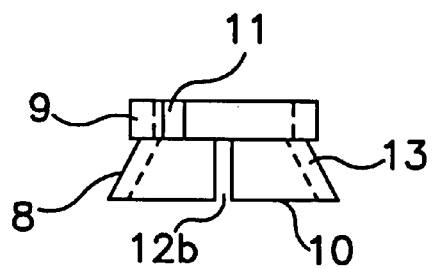
FIG. 7 is a view similar to FIG. 4 but showing conical surfaces on the bush which defines the collar.

Finally a further embodiment provides for the side surfaces of the elliptical center and/or of the bush to be substantially conical as is seen by the sides of 1a of FIG. 6 and the sides 13 of FIG. 7.

What is claimed is:

1. A detachable fitting device for fitting a mechanical component having a cylindrical axial hole onto a rotatable shaft of circular section wherein the mechanical component is rotated by the shaft, comprising: at least one end collar of said cylindrical hole having a seat shaped according to a substantially elliptical profile and a single unitary bush equipped with an elastically deformable external side surface for the reception of said rotatable shaft and shaped to engage in said elliptical seat, said side surface presenting a first size, measured according to a straight line extending perpendicular to the axis of the bush and inclusive between the minor and major diameters of said elliptical seat, and a second size, also measured according to a straight line perpendicular to the axis of the bush but less than the minor diameter of said elliptical seat whereby the mechanical component is coupled to the shaft for rotation therewith in order to transmit torque.

2. A fitting device according to claim 1, characterized in that said bush, when at least partly engaged in said elliptical seat, is rotatable between an unlocked position in which the first size of said bush is substantially in correspondence with the major diameter of said elliptical seat and a locked position in which said bush is forced so that its first size is close to the minor diameter of said elliptical seat.

3. A fitting device according to claim 2, characterized in that said bush has at least one longitudinal cutout to confer elasticity and to allow said forcing by reduction of the gaps of said cutout or cutouts.

4. A fitting device according to claim 3, characterized in that said bush comprises, extending parallel to the axis thereof, a substantially circular external section and at least one cutout in correspondence to which said second dimension is defined.

5. A fitting device according to claim 4, characterized in that said bush comprises a pair of diametrically opposed cutouts in correspondence to which second dimension is defined.

6. A fitting device according to claim 2, characterized in that said bush comprises, perpendicularly to the axis thereof, a substantially elliptical external section.

7. A fitting device according to claim 6, characterized in that said bush comprises at least one longitudinal cutout to increase elasticity thereof.

8. A fitting device according to claim 1 characterized in that said bush comprises an external end ring or flange, shaped for the application of a tool to control bush fitting and unfitting rotations in said elliptical seat.

9. A fitting device according to claim 8, characterized in that said end collar of said cylindrical hole comprises at least one prominence to cooperate with said bush to define a stop position of rotation for the same bush.

10. A fitting device according to claim 9 characterized in that the side surface of the said elliptical seat or said external side surface of the bush are conical.

11. A fitting device according to claim 7, characterized in that said bush comprises an external end ring or flange shaped for the application of a tool to control bush fitting and unfitting rotations in said elliptical seat.

12. A fitting device according to claim 1, characterized in that the side surface of the said elliptical seat and said external side surface of the bush are conical.

13. A fitting device according to claim 1 characterized in that said bush comprises an external end ring or flange, endowed with lugs for the application of a tool to control bush fitting and unfitting rotations in said elliptical seat.

14. A fitting device according to claim 1, characterized in that the side surface of the said elliptical seat and said external side surface of the bush are conical.

15. The detachable fitting device of claim 1 wherein the mechanical component is a hub.

16. The detachable fitting device of claim 1 wherein the mechanical component is a hub with a tractor roller disposed therearound.

17. The detachable fitting device of claim 1 wherein the mechanical component is a hub with a tractor roller for yarn disposed therearound.

* * * * *